(12) United States Patent
Kiyotaki (10) Patent No.: US 9,001,159 B2
(45) Date of Patent: Apr. 7, 2015

(54) INFORMATION-PROCESSING DEVICE, INFORMATION-PROCESSING METHOD AND PROGRAM

(75) Inventor: Takuji Kiyotaki, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 13/504,794

(22) PCT Filed: Oct. 29, 2010

(86) PCT No.: PCT/KR2010/007559
§ 371 (c)(1),
(2), (4) Date: Apr. 27, 2012

(87) PCT Pub. No.: WO2011/053060
PCT Pub. Date: May 5, 2011

(65) Prior Publication Data
US 2012/0212512 A1      Aug. 23, 2012

(30) Foreign Application Priority Data

Oct. 29, 2009   (JP) .................................. 2009-248659

(51) Int. Cl.
G09G 5/00   (2006.01)
G06F 3/14   (2006.01)

(52) U.S. Cl.
CPC ...... *G06F 3/1407* (2013.01); *G09G 2340/0407* (2013.01); *G09G 2340/045* (2013.01)

(58) Field of Classification Search
None
See application file for complete search history.

(56) References Cited

U.S. PATENT DOCUMENTS

| | | | |
|---|---|---|---|
| 7,307,643 B2 * | 12/2007 | Moroo et al. | 345/667 |
| 7,594,194 B2 * | 9/2009 | Makela | 715/864 |
| 2002/0057281 A1 * | 5/2002 | Moroo et al. | 345/668 |
| 2010/0097401 A1 | 4/2010 | Shiratani | |

FOREIGN PATENT DOCUMENTS

| | | |
|---|---|---|
| JP | 8-339279 A | 12/1996 |
| JP | 10-049336 A | 2/1998 |
| JP | 10-326169 A | 12/1998 |
| JP | 2002-182638 A | 6/2002 |

(Continued)

OTHER PUBLICATIONS

Communication dated Mar. 8, 2013, issued by the European Patent Office in counterpart European Patent Application No. 10827144.6.

(Continued)

*Primary Examiner* — Ryan R Yang
(74) *Attorney, Agent, or Firm* — Sughrue Mion, PLLC (57) ABSTRACT

An information processing apparatus and method are provided, the information processing apparatus including: a display unit that displays content in a display area; a content analyzing unit that obtains a content resolution indicating a resolution of the content by analyzing the content; a display resolution storage unit that stores a display resolution indicating a resolution of the display area; a display resolution storage unit that stores the display resolution from the display resolution storage unit; a display ratio calculating unit that calculates a display ratio of the content based on the content resolution obtained by the content analyzing unit and the display resolution obtained by the display resolution obtaining unit; and a display content generating unit that generates display content by adjusting a size of the content according to the display ratio calculated by the display ratio calculating unit.

5 Claims, 8 Drawing Sheets

(56) References Cited

FOREIGN PATENT DOCUMENTS

| | | |
|---|---|---|
| JP | 2007-264748 A | 10/2007 |
| KR | 10-2002-0006124 A | 1/2002 |
| KR | 10-2002-0015223 A | 2/2002 |
| KR | 10-2005-0089096 A | 9/2005 |
| KR | 10-2006-0004238 A | 1/2006 |
| WO | 2009/001656 A1 | 12/2008 |

OTHER PUBLICATIONS

Stephan Kopf, et al; "Automatic Scaling and Cropping of Videos for Devices with Limited Screen Resolution"; ACM; XP040051287; Oct. 27, 2006; pp. 957-958.

International Search Report (PCT/ISA/210) dated Aug. 1, 2011, issued in International Application No. PCT/KR2010/007559.

\* cited by examiner

INFORMATION-PROCESSING DEVICE, INFORMATION-PROCESSING METHOD AND PROGRAM

CROSS-REFERENCE TO RELATED APPLICATIONS

This application is a National Stage of International Application No. PCT/KR2010/007559, filed Oct. 29, 2010, which claims priority from Japanese Patent Application No. 2009-248659, filed on Oct. 29, 2009, the contents of all of which are incorporated herein by reference in their entirety.

TECHNICAL FIELD

The exemplary embodiments relate to an information processing apparatus, an information processing method, and a program.

RELATED ART

Recently, the use of computers or televisions as display devices for displaying content such as still image content or moving image content is becoming more widespread. In general, a user who views content displayed on a display device, tends to focus on the part (image data or character data) of the content which is relatively large. However, since a display area has a limited space, if the part of the content is too large, the part of the content may extend beyond the display area.

Considering this problem, research has been conducted to increase or reduce a size of content, which is a target to be displayed, in accordance with a display area of a display device.

In a conventional technology, since a user has to increase or reduce a size of content whenever the size of the content needs to be adjusted, viewing content becomes inconvenient for the user. Also, in such a conventional technology, while a size of image data included in content may be increased or reduced, a size of the entire content including character data may not be increased or reduced.

Accordingly, there is provided an information processing apparatus, an information processing method, and a program which may increase or reduce a size of content in accordance with a resolution of a display area without inconveniencing the user.

SUMMARY

According to an aspect of the present invention, there is provided an information processing apparatus including: a display unit that includes a display area and displays content in the display area; a content analyzing unit that obtains a content resolution indicating a resolution of the content by analyzing the content; a display resolution storage unit that stores a display resolution indicating a resolution of the display area; a display resolution obtaining unit that obtains the display resolution from the display resolution storage unit; a display ratio calculating unit that calculates a display ratio of the content based on the display resolution obtained by the display resolution obtaining unit and the content resolution obtained by the content analyzing unit; and a display content generating unit that generates display content by adjusting a size of the content according to the display ratio calculated by the display ratio calculating unit, wherein the display unit displays the display content generated by the display content generating unit in the display area. Accordingly, a size of content may be increased or reduced in accordance with a resolution of a display area without adding user inconvenience.

The display ratio calculating unit may calculate the display ratio by dividing the content resolution obtained by the content analyzing unit by the display resolution obtained by the display resolution obtaining unit.

The information processing apparatus may further include a set information storage unit that stores a maximum value of the display ratio as a set maximum display ratio, wherein the display ratio calculating unit, when the display ratio is greater than the set maximum display ratio stored in the set information storage unit, uses the set maximum display ratio as the display ratio. Accordingly, when a display ratio calculated based on a content resolution and a display resolution is greater than a set maximum display ratio, the set maximum display ratio may be used as a display ratio and display content may be prevented from being excessively increased.

The information processing apparatus may further include a set information storage unit that stores a maximum character size included in the content as a set maximum character size, wherein the content analyzing unit further obtains a content maximum character size that is a maximum character size included in the content by analyzing the content, wherein the display ratio calculating unit, when a character size obtained by multiplying the content maximum character size obtained by the content analyzing unit by the display ratio calculated by the display ratio calculating unit is greater than the set maximum character size stored in the set information storage unit, calculates the display ratio by dividing the set maximum character size by the display resolution. Accordingly, when a character size included in content is greater than a set maximum character size, a display ratio may be calculated by using the set maximum character size and a character size included in display content may be prevented from being excessively increased.

The information processing apparatus may further include a display ratio determining unit and a set information storage unit that stores a maximum character size included in the content as a set maximum character size and stores a maximum value of the display ratio as a set maximum display ratio, wherein the content analyzing unit further obtains a content maximum character size that is the maximum character size included in the content by analyzing the content, wherein the display ratio determining unit includes: a first display ratio determining unit that when the display ratio is greater than the set maximum display ratio stored in the set information storage unit, determines the set maximum display ratio as a first display ratio, and when the display ratio is equal to or less than the set maximum display ratio stored in the set information storage unit, determines the display ratio calculated by the display ratio calculating unit as the first display ratio; a second display ratio determining unit that when a character size obtained by multiplying the content maximum character size obtained by the content analyzing unit by the display ratio calculated by the display ratio calculating unit is greater than the set maximum character size stored in the set information storage unit, determines a second display ratio by dividing the set maximum character size by the display resolution, and when the character size obtained by multiplying the content maximum character size obtained by the content analyzing unit by the display ratio calculated by the display ratio calculating unit is equal to or less than the set maximum character size stored in the set information storage unit, determines the display ratio calculated by the display ratio calculating unit as the second display ratio; and a display ratio selecting unit that selects a smaller one of the first display ratio and the second display ratio as the display ratio used by the display content generating unit. Accordingly, a display ratio when display content is relatively small may be used. Accordingly, a possibility that the display content is displayed beyond a display area may be reduced.

The information processing apparatus may further include a set information storage unit that stores a minimum value of the display ratio as a set minimum display ratio, wherein the display ratio calculating unit, when the display ratio is less than the set minimum display ratio stored in the set information storage unit, uses the set minimum display ratio as the display ratio. Accordingly, when a display ratio calculated based on a content resolution and a display resolution is less than a set minimum display ratio, the set minimum display ratio may be used as the display ratio and display content may be prevented from being excessively reduced.

The information processing apparatus may further include a set information storage unit that stores a minimum character size included in the content as a set minimum character size, wherein the content analyzing unit further obtains a content minimum character size that is the minimum character size included in the content by analyzing the content, wherein the display ratio calculating unit, when a character size obtained by multiplying the content minimum character size obtained by the content analyzing unit by the display ratio calculated by the display ratio calculating unit is less than the set minimum character size stored in the set information storage unit, calculates the display ratio by dividing the set minimum character size by the display resolution. Accordingly, even when a character size included in content is less than a set minimum character size, a display ratio may be calculated by using the set minimum character size and a character size included in display content may be prevented from being excessively reduced.

According to another aspect of the present invention, there is provided an information processing method performed by an information processing apparatus that includes a display unit that includes a display area and displays content in the display area, a display resolution storage unit that stores a display resolution indicating a resolution of the display area, a content analyzing unit, a display resolution obtaining unit, a display ratio calculating unit, and a display content generating unit, the information processing method including: obtaining a content resolution indicating a resolution of content by analyzing the content by using the content analyzing unit, and obtaining the display resolution from the display resolution storage unit by using the display resolution obtaining unit; calculating a display ratio of the content based on the content resolution obtained by the content analyzing unit and the display resolution obtained by the display resolution obtaining unit, by using the display ratio calculating unit; generating display content by adjusting a size of the content according to the display ratio calculated by the display ratio calculating unit, by using the display content generating unit; and displaying in the display area the display content generated by the display content generating unit, by using the display unit.

According to another aspect of the present invention, there is provided a program for allowing a computer to function as an information processing apparatus including: a display unit that includes a display area and displays content in the display area; a content analyzing unit that obtains a content resolution indicating a resolution of the content by analyzing the content; a display resolution storage unit that stores a display resolution indicating a resolution of the display area; a display resolution obtaining unit that obtains the display resolution from the display resolution storage unit; a display ratio calculating unit that calculates a display ratio of the content based on the content resolution obtained by the content analyzing unit and the display resolution obtained by the display resolution obtaining unit; and a display content generating unit that generates display content by adjusting a size of the content according to the display ratio calculated by the display ratio calculating unit, wherein the display unit displays in the display area the display content generated by the display content generating unit.

DETAILED DESCRIPTION OF EXEMPLARY EMBODIMENTS

The inventive concept will now be described more fully with reference to the accompanying drawings, in which exemplary embodiments of the inventive concept are illustrated. Also, in the drawings, elements having substantially the same functions are denoted by the same reference numerals and a repeated explanation thereof will not be given.

An aspect of an exemplary embodiment relates to a technology for automatically adjusting a size of content in accordance with a resolution of a display area. Also, the term content herein refers to any data such as still image data, moving image data, or text data as long as the data may be displayed on a display device.

Figure 1:
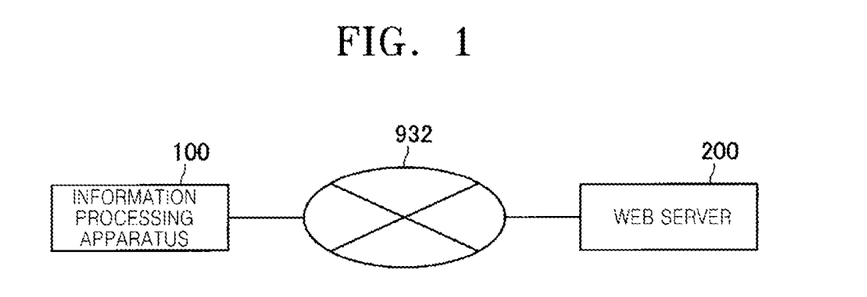
FIG. 1 is a block diagram illustrating an information processing system according to an exemplary embodiment

An information processing system will be explained with reference to FIG. 1. FIG. 1 is a block diagram illustrating an information processing system according to an aspect of an exemplary embodiment.

Referring to FIG. 1, the information processing system mainly includes an information processing apparatus 100, a web server 200, and a network 932. The term network refers to a network such as the Internet in which each device is specified with an Internet protocol (IP) address. The information processing apparatus 100 is not limited to one and a plurality of the information processing apparatuses 100 may be provided. Although content is obtained by the information processing apparatus 100 from the web server 200 via the network 932 in FIG. 1, the information processing apparatus 100 may obtain content in other ways. For example, the information processing apparatus 100 may obtain content by reading the content from a recording medium. Also, the information processing apparatus 100 may read structured data for defining a layout of the content in addition to the content. The structured data may be read from the recording medium.

The structured data is described in a markup language. Examples of the markup language may include a standard generalized markup language (SGML), a hypertext markup language (HTML) developed from the SGML, and TeX. The markup language is not limited thereto. The structured data is described in an HTML file in FIG. 1.

The information processing apparatus 100 may be any apparatus as long as the apparatus may display content on a display device. Examples of the information processing apparatus 100 may include an information processing apparatus such as a personal computer, a portable information terminal such as a personal digital assistant (PDA), a digital television, a game player, a mobile phone, and various information home appliances.

The information processing apparatus 100 of the information processing system will be explained below.

Figure 2:
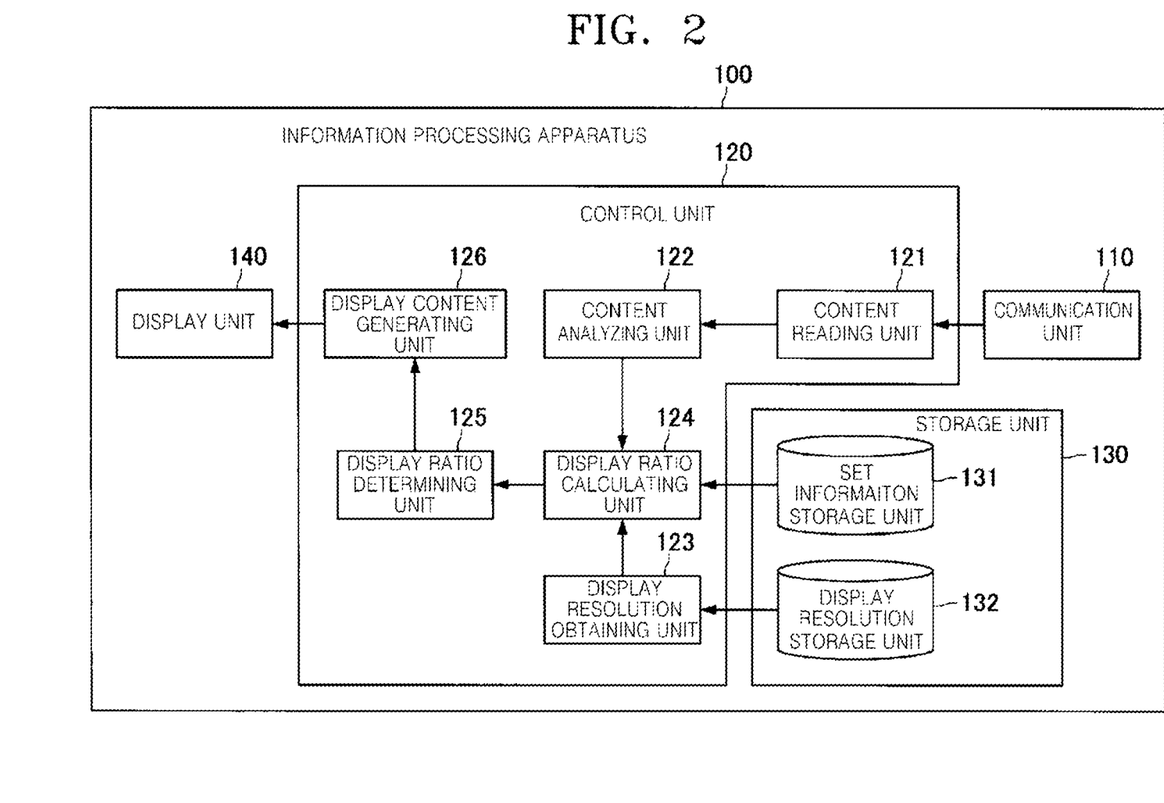
FIG. 2 is a block diagram illustrating a of the information processing apparatus.

An exemplary embodiment of the information processing apparatus 100 will be explained with reference to FIG. 2. FIG. 2 is a block diagram illustrating the information processing apparatus 100.

Referring to FIG. 2, the information processing apparatus 100 may include a communication unit 110, a control unit 120, a storage unit 130, and a display unit 140. The control unit 120 mainly includes a content reading unit 121, a content analyzing unit 122, a display resolution obtaining unit 123, a display ratio calculating unit 124, a display ratio determining unit 125, and a display content generating unit 126. The storage unit 130 may include a set information storage unit 131 and a display resolution storage unit 132.

The content reading unit 121 reads content from the web server 200 via the communication unit 110. For example, when content identification information for identifying content is transmitted to the web server 200 via the network 932, the content reading unit 121 receives the content identified by the content identification information from the web server 200 via the network 932. The content identification information for identifying the content is input to the information processing apparatus 100 by, for example, a user. Also, if the information processing apparatus 100 already stores the content and thus the information processing apparatus 100 does not need to read the content from the web server 200, the information processing apparatus 100 may not include the content reading unit 121.

The content analyzing unit 122 obtains a content resolution indicating a resolution of content by analyzing the content. The content analyzed by the content analyzing unit 122 may be, for example, content read by the content reading unit 121 or content stored in a content storage unit (not shown). The content analyzing unit 122 may analyze content in various ways. For example, when a content resolution is included in an HTML file, the content analyzing unit 122 may obtain the content resolution from the HTML file.

For example, when a display layout of content is described in an HTML file, the content analyzing unit 122 obtains a content resolution by using width and height properties of style attributes of body elements described in the HTML file. The width properties indicate a resolution in a width direction of content and the height properties indicate a resolution in a height direction of the content. As such, the content analyzing unit 122 does not need to calculate a resolution of entire content. Also, for example, if a content resolution is not included in an HTML file, the content analyzing unit 122 may position content according to a display layout of the content described in the HTML file and then may calculate a resolution of the entire content.

Although the content resolution is the resolution of an entire content that is to be displayed, a resolution in a width direction of the entire content may be used or a resolution in a height direction of the entire content may be used. When a user viewing the content scrolls the content many times in a direction, even when the entire content is not included in a display area, a few problems may occur. For example, in the information processing apparatus 100 which allows a user to look at content by scrolling the content in a height direction, it may be more important to obtain content in a width direction than in a height direction of a display area. Therefore, it is more convenient for the user to use a resolution in the width direction as a content resolution.

The content analyzing unit 122 may further obtain a content maximum character size that is a maximum character size included in content by analyzing the content. The content maximum character size obtained by the content analyzing unit 122 is used to calculate a display ratio as will be described below. For example, a size described in an HTML file may be obtained as the content maximum size. If the content maximum size is not described in the HTML file, the content analyzing unit 122 may obtain the content maximum size by detecting a maximum size from among character sizes included in the content.

The content analyzing unit 122 may further obtain a content minimum character size that is a minimum character size included in content by analyzing the content. The content minimum character size obtained by the content analyzing unit 122 is used to calculate a display ratio as will be described below. A size described in an HTML file may be obtained as the content minimum size. If the content minimum size is not described in the HTML file, the content analyzing unit 122 may obtain the content maximum size by detecting a minimum size from among character sizes included in the content.

The display resolution storage unit 132 stores a display resolution indicating a resolution of a display area. The phrase "resolution of a display area" refers to a resolution of content with a maximum size in both a height direction and a width direction of a display area of the display unit 140. A display resolution manipulated by a user may be displayed in the display area and may be confirmed by the user.

The display resolution obtaining unit 123 obtains a display resolution from the display resolution storage unit 132. If a display resolution is manipulated by a user as described above, the display resolution obtaining unit 123 obtains a display resolution from the display resolution storage unit 132 and outputs the display resolution to the display unit 140.

The display ratio calculating unit 124 calculates a display ratio of content based on a content resolution obtained by the content analyzing unit 122 and a display resolution obtained by the display resolution obtaining unit 123. For example, the display ratio calculating unit 124 may calculate a display ratio (display resolution÷content resolution) by dividing the display resolution obtained by the display resolution obtaining unit 123 by the content resolution obtained by the content analyzing unit 122.

The display ratio calculating unit 124 may calculate a display ratio by considering set information set by a user. For example, when a set maximum display ratio is set in the set information storage unit 131 as will be described below and a display ratio is greater than the set maximum display ratio stored in the set information storage unit 131, the display ratio calculating unit 124 may use the set maximum display ratio as a display ratio. Accordingly, when a display ratio calculated based on a content resolution and a display resolution is greater than a set maximum display ratio, the set maximum display ratio may be used as a display ratio and the resolution of the display content may be prevented from being excessively increased.

When a set minimum display ratio is set in the set information storage unit 131 as will be described below and a display ratio is less than the set minimum display ratio stored in the set information storage unit 131, the display ratio calculating unit 124 may use the set minimum display ratio as a display ratio. Accordingly, when a display ratio that is a result of a calculation performed on a content resolution and a display resolution is less than a set minimum display ratio, the set minimum display ratio may be used as a display ratio and the resolution of the display content may be prevented from being excessively reduced.

A set maximum character size may be set in the set information storage unit 131. In this case, when a character size (content maximum character size x display ratio) obtained by multiplying a content maximum character size obtained by the content analyzing unit 122 by a display ratio that is calculated is greater than the set maximum character size stored in the set information storage unit 131, the display ratio calculating unit 124 may calculate a display ratio (set maximum character size÷display resolution) by dividing the set maximum character size by a display resolution. Accordingly, when a character size included in content is greater than a set maximum character size, a display ratio may be calculated by using a set maximum character size and a character size included in display content may be prevented from being excessively increased.

A set minimum character size may be set in the set information storage unit 131 as will be described below. In this case, when a character size (content minimum character size× display ratio) obtained by multiplying a content minimum character size obtained by the content analyzing unit 122 by a display ratio that is calculated is less than the set minimum character size stored in the set information storage unit 131, the display ratio calculating unit 124 may calculate a display ratio (set minimum character size÷display resolution) by dividing the set minimum character size by a display resolution. Accordingly, when a character size included in content is less than a set minimum character size, a display ratio may be calculated by using a set minimum character size and a character size included in display content may be prevented from being excessively reduced.

The display ratio determining unit 125 functions when the set information storage unit 131 stores both a set maximum character size and a set maximum display ratio. In this case, the display ratio determining unit 125 includes, for example, a first display ratio determining unit (not shown), a second display ratio determining unit (not shown), and a display ratio selecting unit (not shown).

When a display ratio calculated by the display ratio determining unit 125 is greater than a set maximum display ratio stored in the set information storage unit 131, the first display ratio determining unit determines the set maximum display ratio as a first display ratio. When a display ratio calculated by the display ratio determining unit 125 is equal to or less than a set maximum display ratio stored in the set information storage unit 131, the first display ratio determining unit determines the display ratio calculated by the display ratio determining unit 125 as a first display ratio.

When a character size, obtained by multiplying a content maximum character size obtained by the content analyzing unit 122 by a display ratio that is calculated, is greater than a set maximum character size stored in the set information storage unit 131, the second display ratio determining unit determines a second display ratio by dividing the set maximum character size by a display resolution. When a character size, obtained by multiplying a content maximum character size obtained by the content analyzing unit 122 by a display ratio that is calculated is equal to or less than a set maximum character size stored in the set information storage unit 131, the second display ratio determining unit determines the display ratio that is calculated as a second display ratio.

The display ratio selecting unit selects a smaller one of the first display ratio and the second display ratio as a display ratio used by the display content generating unit 126. The first display ratio is adjusted to be equal to the set maximum display ratio and the second display ratio is adjusted such that a maximum character size after being adjusted is equal to or less than the set maximum character size. Accordingly, once a smaller one of the first display ratio and the second display ratio is selected as a display ratio used by the display content generating unit 126, a display ratio when display content is relatively small may be used. Accordingly, a possibility that display content is displayed beyond a display area may be reduced.

Alternatively, the display ratio selecting unit may select a larger one of the first display ratio and the second display ratio as a display ratio used by the display content generating unit 126. In this case, a display ratio when display content is relatively large may be used. Accordingly, a possibility that a character having a small size and included in content that is displayed in a display area may be reduced.

When a display ratio calculated by the display ratio determining unit 125 is less than a set minimum display ratio stored in the set information storage unit 131, the first display ratio determining unit may determine the set minimum display ratio as a first display ratio. When a display ratio calculated by the display ratio determining unit 125 is equal to or greater than a set minimum display ratio stored in the set information storage unit 131, the first display ratio determining unit may determine the display ratio calculated by the display ratio determining unit 125 as a first display ratio.

When a character size obtained by multiplying a content minimum character size obtained by the content analyzing unit 122 by a display ratio that is calculated is less than a set minimum character size stored in the set information storage unit 131, the second display ratio determining unit may determine a second display ratio by dividing the set minimum character size by a display resolution. When a character size obtained by multiplying a content minimum character size obtained by the content analyzing unit 122 by a display ratio that is calculated is equal to or greater than a set minimum character size stored in the set information storage unit 131, the second display ratio determining unit may determine the display ratio that is calculated as a second display ratio.

The display content generating unit 126 generates display content by adjusting a size of content according to a display ratio calculated by the display ratio calculating unit 124. When a display ratio calculated by the display ratio calculating unit 124 is, for example, 200%, the display content generating unit 126 generates display content by increasing the size of the content two times. When a display ratio calculated by the display ratio calculating unit 124 is, for example, 50%, the display content generating unit 126 generates display content by reducing the size of the content 0.5 times.

The display unit 140 having a display area may display content in the display area. Also, the display unit 140 displays in the display area display content generated by the display content generating unit 126. The display unit 140 includes, for example, a display device as will be described below.

The set information storage unit 131 stores set information set by a user. There may be various types of set information.

When a maximum value of a display ratio is set by a user, the set information storage unit 131 may store the maximum value as a set maximum display ratio. Also, when a minimum value of a display ratio is set by a user, the set information storage unit 131 may store the minimum value as a set minimum display ratio. Also, the set information storage unit 131 may store a maximum character size included in content as a set maximum character size. Also, the set information storage unit 131 may store a minimum character size included in content as a set minimum character size.

An exemplary embodiment of the information processing apparatus 100 has been described. In this configuration, a size of content may be increased or reduced in accordance with a resolution of a display area without adding user inconvenience.

An information processing method performed by the information processing apparatus 100 will be explained below with reference to FIGS. 3 through 7. FIGS. 3 through 7 are flowcharts illustrating an information processing method performed by the information processing apparatus 100, according to an exemplary embodiment.

Figure 3:
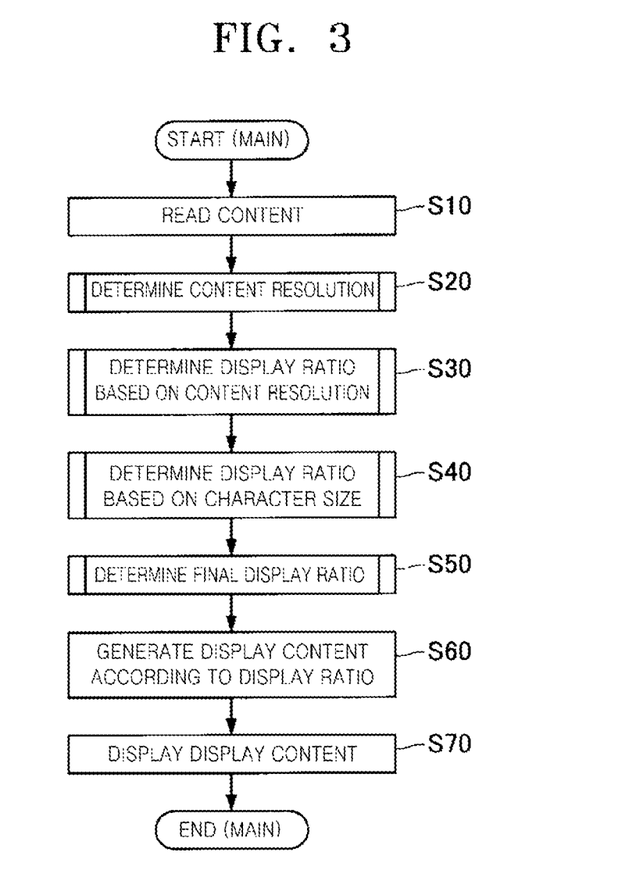
FIG. 3 is a flowchart illustrating a main process performed by the information processing apparatus.

FIG. 3 is a flowchart illustrating a main process of the information processing method performed by the information processing apparatus 100. The main process performed by the information processing apparatus 100 will be explained with reference to FIG. 3.

Referring to FIG. 3, in operation S10, the content reading unit 121 reads content from the web server 200 via the network 932. Although the content reading unit 121 obtains content by reading the content from the web server 200 in FIG. 3, the content reading unit 121 may obtain content by using other methods as described above. Also, the content reading unit 121 obtains structured data such as an HTML file in addition to the content from the web server 200. The structured data such as the HTML file may be obtained by being read from the web server 200 or by using other methods.

In operation S20, the information processing apparatus 100 determines a content resolution. Operation S20 will be explained below in detail with reference to FIG. 4. Next, in operation S30, the information processing apparatus 100 determines a display ratio by using the content resolution. Operation S30 will be explained below in detail with reference to FIG. 5. Next, in operation S40, the information processing apparatus 100 determines a display ratio by using a character size. Operation S40 will be explained below in detail with reference to FIG. 6. Next, in operation S50, the information processing apparatus 100 determines a final display ratio. Operation S50 will be explained below in detail with reference to FIG. 7.

Figure 4:
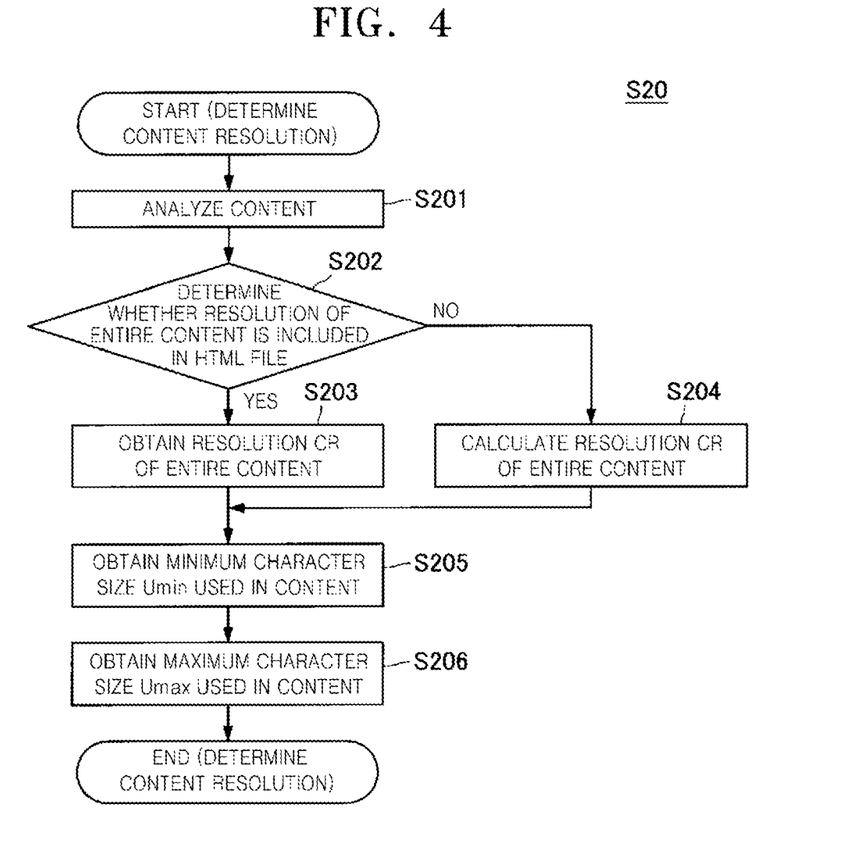
FIG. 4 is a flowchart illustrating a process of determining a resolution of content performed by the information processing apparatus.

FIG. 4 is a flowchart illustrating operation S20 in which a content resolution is determined as performed by the information processing apparatus 100. Operation S20 in which a content resolution is determined as performed by the information processing apparatus 100 will be explained with reference to FIG. 4.

Referring to FIG. 4, in operation S201, the content analyzing unit 122 of the information processing apparatus 100 analyzes content. Next, in operation S202, the content analyzing unit 122 determines whether a resolution of the entire content is included in an HTML file. When it is determined in operation S202 that the resolution of the entire content is included in the HTML file, the method proceeds to operation S203. In operation S203, the resolution CR of the entire content is obtained and operation S203 proceeds to operation S205. When it is determined in operation S202 that the resolution of the entire content is not included in the HTML file, operation S203 proceeds to operation S204. In operation S204, the resolution CR of the entire content is calculated, and operation S20 proceeds to operation S205.

In operation S205, the content analyzing unit 122 obtains a minimum character size used in the content. In operation S206, a maximum character size used in the content is obtained, and operation S20 ends.

Figure 5:
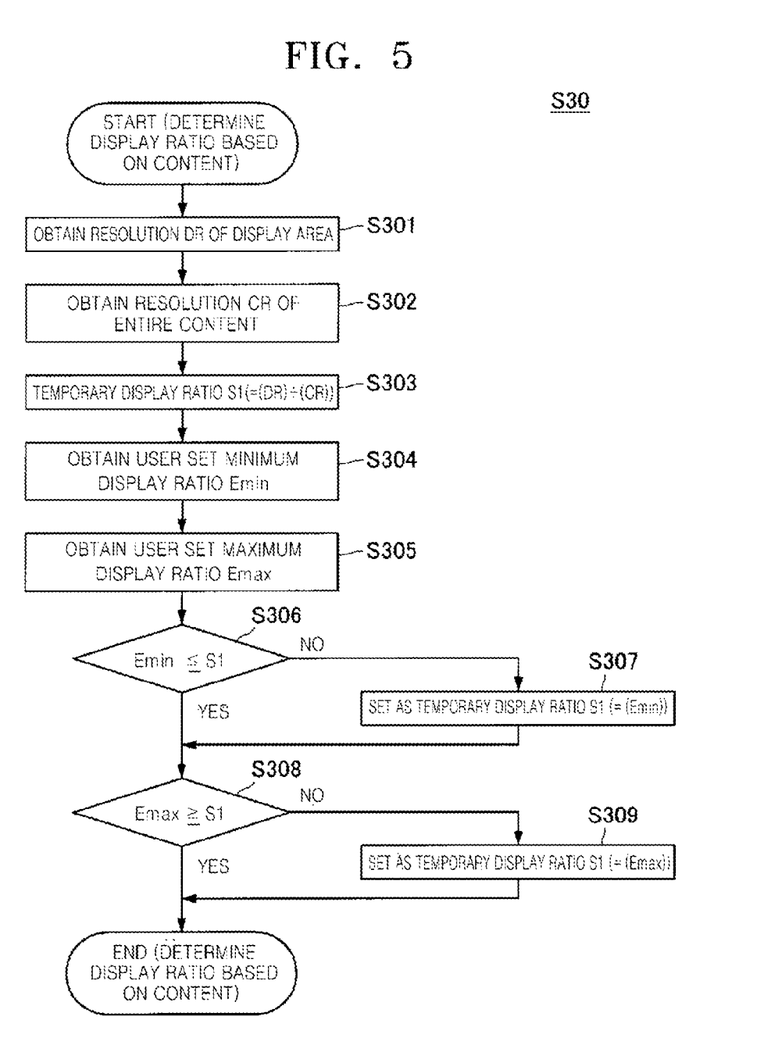
FIG. 5 is a flowchart illustrating a process of determining a display ratio by using a resolution of content performed by the information processing apparatus.

FIG. 5 is a flowchart illustrating operation S30 in which a display ratio is determined based on a content resolution as performed by the information processing apparatus 100. Operation S30 in which a display ratio is determined based on a content resolution as performed by the information processing apparatus 100 will be explained with reference to FIG. 5.

Referring to FIG. 5, in operation S301, the display resolution obtaining unit 123 of the information processing apparatus 100 obtains a resolution DR of a display area from the display resolution storage unit 132. Next, in operation S302, the content analyzing unit 122 obtains a resolution CR of entire content. A resolution obtained in operation S203 or operation S204 may be used as the resolution CR of the entire content. In operation S303, the display ratio calculating unit 124 calculates a temporary display ratio S1 as (S1)=(DR)÷(CR). The temporary display ratio S1 corresponds to the first display ratio. Next, in operation S304, the display ratio calculating unit 124 obtains a user set minimum display ratio Emin from the set information storage unit 131, and in operation S305, the display ratio calculating unit 124 obtains a user set maximum display ratio Emax from the set information storage unit 131.

In operation S306, the display ratio calculating unit 124 determines whether the user set minimum display ratio Emin is equal to or less than the temporary display ratio S1. When it is determined in operation S306 that the user set minimum display ratio Emin is greater than the temporary display ratio S1, operation S306 proceeds to operation S307. In operation S307, the user set minimum display ratio Emin is set as the temporary display ratio S1, and operation S307 proceeds to operation S308. When it is determined in operation S306 that the user set minimum display ratio Emin is equal to or less than the temporary display ratio S1, operation S306 proceeds to operation S308.

In operation S308, the display ratio calculating unit 124 determines whether the user set maximum display ratio Emax is equal to or greater than the temporary display ratio S1. When it is determined in operation S308 that the user set maximum display ratio Emax is less than the temporary display ratio S1, the display ratio calculating unit 124 sets the user set maximum display ratio Emax as the temporary display ratio S1 in operation S309, and operation S30 ends. When it is determined in operation S308 that the user set maximum display ratio Emax is greater than or equal to the temporary display ratio S1, operation S30 ends.

Figure 6:
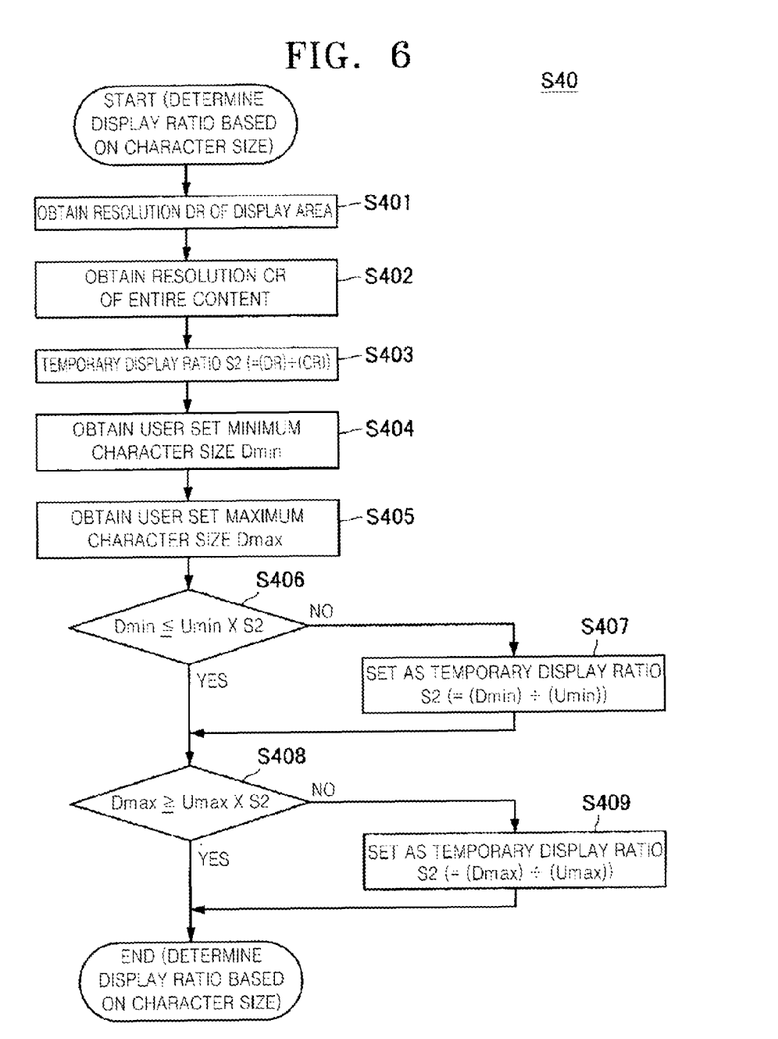
FIG. 6 is a flowchart illustrating a process of determining a display ratio by using a character size performed by the information processing apparatus.

FIG. 6 is a flowchart illustrating operation S40 in which a display ratio is determined based on a character size as performed by the information processing apparatus 100. Operation S40 in which a display ratio is determined based on a character size as performed by the information processing apparatus 100 will be explained with reference to FIG. 6.

Referring to FIG. 6, in operation S401, the display resolution obtaining unit 123 of the information processing apparatus 100 obtains a resolution DR of a display area from the display resolution storage unit 132. A display resolution obtained in operation S401 may be used as the display resolution DR. Next, in operation S402, the content analyzing unit 122 obtains a resolution CR of entire content. A resolution obtained in operation S203 or S204 may be used as the resolution CR of the entire content. In operation S403, the display ratio calculating unit 124 calculates a temporary display ratio S2 as (S2)=(DR)÷(CR). The temporary display ratio S2 corresponds to the second display ratio. Next, in operation S404, the display ratio calculating unit 124 obtains a user set minimum character size Dmin from the set information storage unit 131. In operation S405, the display ratio calculating unit 124 obtains a user set maximum character size Dmax from the set information storage unit 131.

In operation S406, the display ratio calculating unit 124 determines whether the user set minimum character size Dmin is equal to or less than a value obtained by multiplying a minimum character size included in content by the temporary display ratio S2. When it is determined in operation S406 that the user set minimum character size Dmin is greater than the value obtained by multiplying the minimum character size Umin included in the content by the temporary display ratio S2, operation S406 proceeds to operation S407. In operation S407, the display ratio calculating unit 124 sets a result ((Dmin)÷(Umin)) obtained by dividing the user set minimum character size Dmin by the minimum character size Umin included in the content as the temporary display ratio S2, and operation S407 proceeds to operation S408. When it is determined in operation S406 that the user set minimum character size Dmin is equal to or less than the value obtained by multiplying the minimum character size included in the content by the temporary display ratio S2, operation S406 proceeds to operation S408.

In operation S408, the display ratio calculating unit 124 determines whether the user set maximum character size Dmax is equal to or greater than a value obtained by multiplying a maximum character size Umax included in the content by the temporary display ratio S2. When it is determined in operation S408 that the user set maximum character size Dmax is less than the value obtained by multiplying the maximum character size Umax included in the content by the temporary display ratio S2, the display ratio calculating unit 124 sets a result ((Dmax)÷(Umax)) obtained by dividing the user set maximum character size Dmax by the maximum character size Umax included in the content as the temporary display ratio S2 in operation S409, and operation S40 ends. When it is determined in operation S408 that the user set maximum character size Dmax is equal to or greater than the value obtained by multiplying the maximum character size Umax included in the content by the temporary display ratio S2, operation S40 ends.

Figure 7:
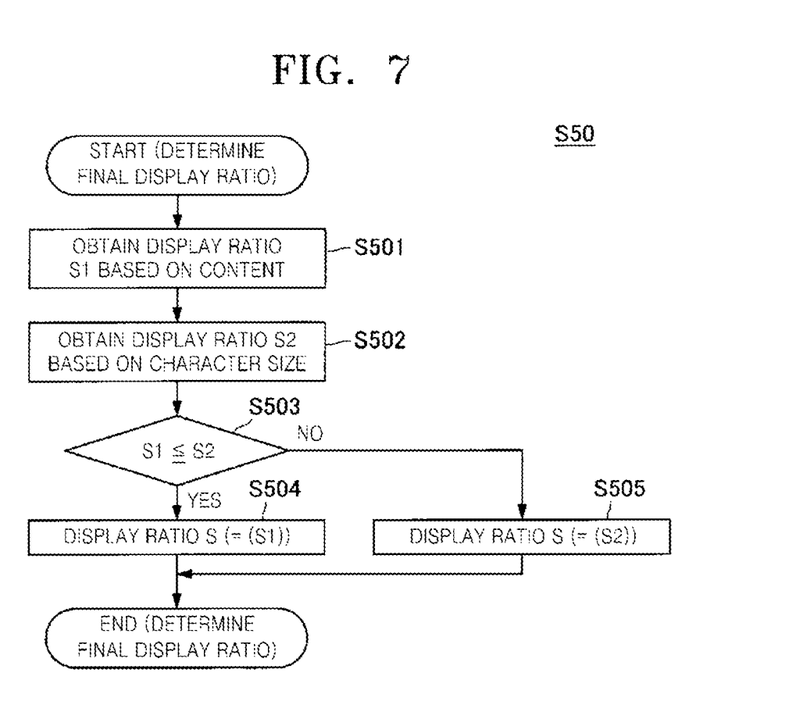
FIG. 7 is a flowchart illustrating a process of determining a final display ratio performed by the information processing apparatus.

FIG. 7 is a flowchart illustrating operation S50 in which a final display ratio is determined as performed by the information processing apparatus 100. Operation S50 in which a final display ratio is determined as performed by the information processing apparatus 100 will be explained with reference to FIG. 7.

Referring to FIG. 7, in operation S501, the display ratio determining unit 125 of the information processing apparatus 100 obtains a display ratio S1 based on content. In operation S502, the display ratio determining unit 125 obtains a display ratio S2 based on a character size. A display ratio obtained by operation S30 of FIG. 5 may be used as the display ratio S1 based on the content. A display ratio obtained by operation S40 of FIG. 6 may be used as the display ratio S2 based on the character size.

In operation S503, the display ratio determining unit 125 determines whether the display ratio S1 based on the content is equal to or less than the display ratio S2 based on the character size. When it is determined in operation S503 that the display ratio S1 based on the content is equal to or less than the display ratio S2 based on the character size, operation S50 proceeds to operation S504. In operation S504, the display ratio determining unit 125 sets the display ratio S1 based on the content as a display ratio S and operation S50 ends. When it is determined in operation S503 that the display ratio S1 based on the content is greater than the display ratio S2 based on the character size, operation S50 proceeds to operation S505. In operation S505, the display ratio determining unit 125 sets the display ratio S2 as a display ratio S, and operation S50 ends. The display ratio S is used to generate display content in operation S60.

According to operation S50 of FIG. 7, a size of content may be increased or reduced in accordance with a resolution of a display area without adding user inconvenience.

Figure 8:
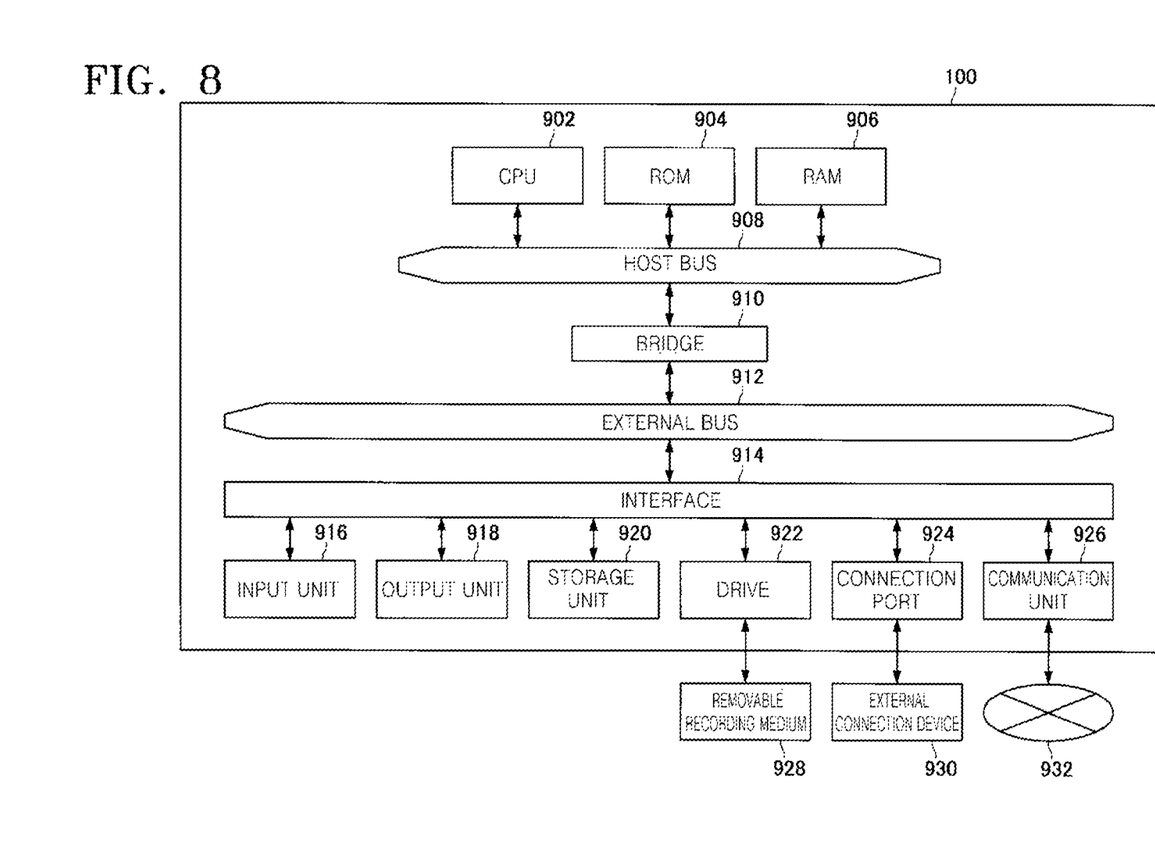
FIG. 8 is a block diagram illustrating hardware of a terminal device.

Functions of elements constituting the information processing apparatus 100 may be performed by using a computer program for executing the functions by using devices forming hardware in FIG. 8. FIG. 8 is a block diagram illustrating hardware of the information processing apparatus 100 for performing functions of elements of the information processing apparatus 100.

Referring to FIG. 8, the information processing apparatus 100 includes a central processing unit (CPU) 902, a read-only memory (ROM) 904, a random access memory (906), a host bus 908, a bridge 910, an external bus 912, an interface 914, an input unit 916, an output unit 918, a storage unit 920, a drive 922, a connection port 924, and a communication unit 926.

The CPU 902 functions as a calculator or a controller and controls an overall or partial operation of each element of the information processing apparatus 100 based on various programs recorded on the ROM 904, the RAM 906, the storage unit 920, or a removable recording medium 928. The ROM 904 stores calculation data or programs read by the CPU 902. The RAM 906 temporarily or permanently stores the programs read by the CPU 902 or various parameters which appropriately vary when the programs are executed. The CPU 902, the ROM 904, and the RAM 906 are connected to one another via the host bus 908 through which data may be transmitted at a high speed. Also, the host bus 908 is connected to the external bus 912 through which data may be transmitted at a low speed via the bridge 910.

The input unit 916 is a manipulation unit such as a mouse, a keyboard, a touch panel, a button, a switch, or a lever. Alternatively, the input unit 916 may be a remote control unit that may transmit a control signal by using infrared rays or other electric waves. Also, the input unit 916 may include an input control circuit for transmitting information input by using the manipulation unit as an input signal to the CPU 902.

The output unit 918 may visually or audibly provide to a user information obtained by a display device such as a cathode ray tube (CRT), a liquid crystal display (LCD), a plasma display panel (PDP), or an electro-luminescence display (ELD), an audio output device such as a speaker or a headphone, a printer, a mobile phone, or a facsimile machine.

The storage unit 920 for storing various data may include, for example, a magnetic storage device such as a hard disk drive (HDD), a semiconductor storage device, an optical storage device, or a magneto-optical storage device.

The drive 922 reads information recorded on the removable recording medium 928 such as a magnetic disk, an optical disk, a magneto-optical disk, or a semiconductor memory, or writes information to the removable recording medium 928. Examples of the removable recording medium 928 may include a DVD medium, a Blu-ray medium, a high definition (HD)-DVD medium, a compact flash (CF) (trademark), a memory stick, and a secure digital (SD) memory card. Examples of the removable recording medium 928 may also include an integrated circuit (IC) card including a contactless IC chip or an electronic device.

The connection port 924 is a port for connecting an external connection device 930 such as a universal serial bus (USB) port, an IEEE 1394 port, a small computer system interface (SCSI), an RS-232C port, or an optical audio terminal. Examples of the external connection device 930 may include a printer, a portable music player, a digital camera, a digital video camera, and an IC recorder.

Examples of the communication unit 926 for connecting to the network 932 may include a wired or wireless local area network (LAN), a Bluetooth (trademark), a communication card for wireless USB (WUSB), a router for optical communication, a router for asymmetric digital subscriber line (SL), and a modem for various communications. Examples of the network 932 connected to the communication unit 926 in a wired or wireless manner may include the Internet, a LAN in a household, an infrared communication network, a visible communication network, a broadcast communication network, and a satellite communication network.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

Accordingly, an information processing apparatus, an information processing method, and a program may increase or reduce a size of content in accordance with a resolution of a display area without inconveniencing the user.

What is claimed is:

1. An information processing method performed by an information processing apparatus, the information processing method comprising:
   obtaining a display resolution indicating a resolution of a display;
   analyzing content and obtaining a content resolution indicating a resolution of the content and obtaining a character size of the content;
   calculating a first display ratio of the content based on the content resolution and the display resolution;
   calculating a second display ratio of the content based on the character size and the display resolution;
   setting a final display ratio as one of the first display ratio or the second display ratio;
   adjusting a size of the content according to the final display ratio; and
   generating the size adjusted content to be displayed.

2. The information processing method of claim 1, wherein the analyzing the content and obtaining the content resolution indicating the resolution of the content and obtaining the character size of the content further comprises:
   calculating the content resolution when resolution information of the content is not included in the content;
   obtaining the content resolution when resolution information of the content is included in the content;
   obtaining a minimum character size used in the content; and
   obtaining a maximum character size used in the content.

3. The information processing method of claim 2, wherein the calculating the first display ratio of the content based on the content resolution and the display resolution further comprises:
   calculating a temporary display ratio by dividing the display resolution by the content resolution;
   obtaining a user set minimum display ratio and a user set maximum display ratio;
   setting the first display ratio to be the temporary display ratio when the temporary display ratio is greater than or equal to the user set minimum display ratio and less than or equal to the user set maximum display ratio;
   setting the first display ratio to be the user set maximum display ratio when the temporary display ratio is greater than the user set maximum display ratio; and
   setting the first display ratio to be the user set minimum display ratio when the temporary display ratio is less than the user set minimum display ratio.

4. The information processing method of claim 2, wherein the calculating the second display ratio of the content based on the character size and the display resolution further comprises:
   calculating a temporary display ratio by dividing the display resolution by the content resolution;
   obtaining a user set minimum character size and a user set maximum character size;
   setting the second display ratio to be the temporary display ratio when the user set minimum character size is less than or equal to the minimum character size used in the content multiplied by the temporary display ratio and the user set maximum character size is greater than or equal to the maximum character size used in the content multiplied by the temporary display ratio;
   setting the second display ratio to be the user set minimum character size divided by the minimum character size used in the content when the user set minimum character size is greater than the minimum character size used in the content multiplied by the temporary display ratio; and
   setting the second display ratio to be the user set maximum character size divided by the maximum character size used in the content when the user set maximum character size is less than the maximum character size used in the content multiplied by the temporary display ratio.

5. The information processing method of claim 1, wherein the setting the final display ratio as one of the first display ratio or the second display ratio further comprises:
   setting the first display ratio as the final display ratio when first display ratio is greater than the second display ratio; and
   setting the second display ratio as the final display ratio when first display ratio is less than or equal to the second display ratio.

* * * * *